(12) United States Patent
Yoshida et al.

(10) Patent No.: US 8,269,427 B2
(45) Date of Patent: Sep. 18, 2012

(54) ILLUMINATING DEVICE AND METHOD OF CALIBRATING ILLUMINATING DEVICE

(75) Inventors: Hiroyuki Yoshida, Kure (JP); Naoki Shirai, Kure (JP)

(73) Assignee: Mitutoyo Corporation, Kawasaki, Kanagawa (JP)

( * ) Notice: Subject to any disclaimer, the term of this patent is extended or adjusted under 35 U.S.C. 154(b) by 243 days.

(21) Appl. No.: 12/871,312

(22) Filed: Aug. 30, 2010

(65) Prior Publication Data

US 2011/0050107 A1    Mar. 3, 2011

(30) Foreign Application Priority Data

Aug. 31, 2009  (JP) ................... 2009-199439

(51) Int. Cl.
*H05B 37/02*    (2006.01)

(52) U.S. Cl. ....................... 315/292; 315/151

(58) Field of Classification Search .............. 315/149, 315/151, 291, 292; 396/155
See application file for complete search history.

(56) References Cited

U.S. PATENT DOCUMENTS 6,949,891 B2 *   9/2005   Shimizu et al. ............... 315/300
7,015,447 B2 *   3/2006   Yoshida et al. ............... 250/205

FOREIGN PATENT DOCUMENTS

JP          2004-220834         8/2004

* cited by examiner

*Primary Examiner* — Thuy Vinh Tran
(74) *Attorney, Agent, or Firm* — Rankin, Hill & Clark LLP

(57) ABSTRACT

An illuminating device includes: a calibrating output unit for reading an output current command value corresponding to a specific brightness command value and for outputting the output current command value to a light source; a ratio calculating unit for calculating a ratio between an illuminance of illuminating light emitted from the light source and a prescribed illuminance value prescribed for the specific brightness command value; an illuminance calculating unit for calculating each illuminance when each output current command value matched with each brightness command value is outputted; and a calibrating unit for calibrating a relationship between each brightness command value and each output current command value in a conversion table such that each illuminance at the time when each output current command value matched with each brightness command value is outputted is set to each prescribed illuminance value prescribed for each of the brightness command values.

4 Claims, 7 Drawing Sheets

FIG. 2

DIAGRAM SHOWI9NG A PART OF CONVERSION TABLE 411

| BRIGHTNESS COMMAND VALUE (%) | OUTPUT CURRENT COMMAND VALUE (DAC) |
|---|---|
| 0 | 0 |
| 25 | 108 |
| 50 | 400 |
| 75 | 1130 |
| 100 | 2892 |

FIG. 3

DIAGRAM SHOWING PRESCRIBED VALUES OF ILLUMINANCE FOR BRIGHTNESS COMMAND VALUES

| BRIGHTNESS COMMAND VALUE (%) | PRESCRIBED ILLUMINANCE VALUE (Lx) |
|---|---|
| 0 | 0 |
| 25 | 1557 |
| 50 | 4325 |
| 75 | 9247 |
| 100 | 18000 |

FIG. 4

DIAGRAM SHOWING RELATIONSHIP BETWEEN CONVERSION TABLE CALIBRATED AT THE TIME OF SHIPMENT OF ILLUMINATING DEVICE AND PRESCRIBED ILLUMINATION VALUES

411

| BRIGHTNESS COMMAND VALUE (%) | OUTPUT CURRENT COMMAND VALUE (DAC) | PRESCRIBED ILLUMINANCE VALUE (Lx) |
|---|---|---|
| 0 | 0 | 0 |
| 25 | 108 | 1557 |
| 50 | 400 | 4325 |
| 75 | 1130 | 9247 |
| 100 | 2892 | 18000 |

FIG. 6

DIAGRAM SHOWING ILLUMINANCE MEASURED IN
CALIBRATION-USE OUTPUT STEP

| OUTPUT CURRENT COMMAND VALUE (DAC) | ILLUMINANCE (Lx) |
|---|---|
| 2892 | 12600 |

FIG. 7

DIAGRAM SHOWING illuminating device WITH RESPECT TO EACH OUTPUT CURRENT COMMAND VALUE CALCULATED FROM A CALCULATED RATIO

| BRIGHTNESS COMMAND VALUE (%) | OUTPUT CURRENT COMMAND VALUE (DAC) | ILLUMINANCE (Lx) |
|---|---|---|
| 0 | 0 | 0 |
| 25 | 108 | 1090 |
| 50 | 400 | 3027 |
| 75 | 1130 | 6453 |
| 100 | 2892 | 12600 |

FIG. 8

DIAGRAM SHOWING RELATIONSHIP BETWEEN CALIBRATED CONVERSION TABLE AND PRESCRIBED ILLUMINANCE VALUES

| BRIGHTNESS COMMAND VALUE (%) | OUTPUT CURRENT COMMAND VALUE (DAC) | PRESCRIBED ILLUMINANCE VALUE (Lx) |
|---|---|---|
| 0 | 0 | 0 |
| 25 | 178 | 1557 |
| 50 | 675 | 4325 |
| 75 | 1928 | 9247 |
| 100 | 4445 | 18000 |

FIG. 9

DIAGRAM SHOWING RELATIONSHIP BETWEEN
CALIBRATED CONVERSION TABLE AND
PRESCRIBED ILLUMINANCE VALUES

411

| BRIGHTNESS COMMAND VALUE (%) | OUTPUT CURRENT COMMAND VALUE (DAC) | PRESCRIBED ILLUMINANCE VALUE (Lx) |
|---|---|---|
| 0 | 0 | 0 |
| 19 | 108 | 1090 |
| 40 | 400 | 3027 |
| 63 | 1130 | 6453 |
| 86 | 2892 | 12600 |
| 100 | 4445 | 18000 |

ILLUMINATING DEVICE AND METHOD OF CALIBRATING ILLUMINATING DEVICE

CROSS-REFERENCE TO RELATED APPLICATION(S)

This application is based upon and claims the benefit of priority from Japanese Patent Application No. 2009-199439, filed on Aug. 31, 2009, the entire contents of which are incorporated herein by reference.

BACKGROUND

1. Field of the Invention

The present invention relates to an illuminating device and a method of calibrating an illuminating device.

2. Description of the Related Art

Conventionally, an image processing apparatus is used which is provided with an illuminating device having an LED (light emitting diode) for irradiating a workpiece with light and a controller for controlling the LED, and in which an image of the workpiece is obtained by irradiating the workpiece with light by the illuminating device so as to determine a profile of the workpiece from the image of the workpiece. The controller reads from a predetermined conversion table an output current command value corresponding to a brightness command value, which is a command value of illuminance inputted from outside, and outputs the output current command value thus read to a DA converter, to thereby light the LED. However, the illuminance of the LED at the time when the predetermined current value is inputted is greatly dependent on the characteristics of the LED. For this reason, if, with respect to the inputted brightness command value, the controller outputs a uniformly predetermined output current command value to the LED on the basis of the conversion table, there are cases where the commanded illuminance cannot be obtained due to the characteristics of the LED incorporated in the illuminating device.

In the image processing apparatus, if the illuminance becomes lower than the commanded illuminance, the quantity of light becomes insufficient, in which case there are possibilities that an image of the workpiece cannot be obtained, and edges of the workpiece cannot be detected. Meanwhile, if the illuminance becomes higher than the commanded illuminance, the image of the workpiece becomes blurred, possibly making it impossible to detect edges of the workpiece. For these reasons, with the illuminating device used in the image processing apparatus, controlling of the light source such that the commanded illuminance can be obtained becomes an extremely important issue.

Accordingly, an illuminating device has been developed in which the conversion table is calibrated before shipment in correspondence with the characteristics of the incorporated LED (e.g., JP-A-2004-220834). The illuminating device of JP-A-2004-220834 at a shipment stage is capable of irradiating with a commanded illuminance irrespective of the characteristics of the incorporated LED.

However, since the LED undergoes a decline in illuminance with the lapse of time, with the illuminating device of JP-A-2004-220834, after the lapse of sufficient operating time after shipment the conversion table becomes incapable of coping with the LED whose illuminance has dropped, possibly making it impossible to irradiate with the commanded illuminance. Accordingly, with the illuminating device of JP-A-2004-220834, in the case where sufficient operating time has elapsed after shipment, it is desirable to recalibrate the conversion table in correspondence with the decline in the illuminance of the LED. However, in the recalibration of the conversion table by the illuminating device of JP-A-2004-220834, it is necessary to perform time-consuming measurement of illuminance a number of times. For this reason, there is a problem in that much time is required in the case of recalibrating the conversion table by the illuminating device of JP-A-2004-220834.

SUMMARY

An object of the invention is to provide an illuminating device and a method of calibrating an illuminating device which make it possible to perform in a short time the calibration associated with the decline in the illuminance of the light source due to the lapse of time.

According to an aspect of the invention, there is provided an illuminating device including: a storage unit configured to store a conversion table in which an output current command value is matched with each brightness command value which is an inputted command value of illuminance; a light source; and a control unit including: a calibrating output unit configured to read from the conversion table an output current command value corresponding to a specific brightness command value, and configured to output the output current command value to the light source; a ratio calculating unit configured to calculate a ratio between the illuminance of illuminating light emitted from the light source and a prescribed illuminance value prescribed for the specific brightness command value, when the output current command value read by the calibrating output unit is outputted to the light source; an illuminance calculating unit configured to calculate each illuminance when each output current command value matched with each brightness command value is outputted, from each prescribed illuminance value prescribed for each of the brightness command values and from the calculated ratio; and a calibrating unit configured to calibrate a relationship between each brightness command value and each output current command value in the conversion table on the basis of the relationship between each output current command value matched with each brightness command value and each of the calculated illuminances, such that each illuminance at the time when each output current command value matched with each brightness command value is outputted is set to each prescribed illuminance value prescribed for each of the brightness command values.

The largest cause of a decline in the illuminance of the light source with the lapse of time lies in the fact that a sealing material sealing a light-emitting portion deteriorates due to the lapse of time and its transmittance declines. Accordingly, since the illuminance of the light source declines uniformly at the same ratio due to the lapse of time with respect to any output current command value, if measurement is made of only the illuminance of the illuminating light when the light source is lit up at a specific output current command value, it is possible to calculate the aforementioned ratio, i.e., a rate of decline in the illuminance of the light source. Accordingly, in the present invention, first, the light source is lit up at an output current command value corresponding to a specific brightness command value, and calculation is made of a ratio between the illuminance of the illuminating light measured at that time and a prescribed illuminance value prescribed for the specific brightness command value, i.e., a rate of decline in the illuminance of the light source.

At the time of shipment of the illuminating device, each output current command value is matched with each brightness command value in the conversion table such that the illuminance is set to a prescribed illuminance value prescribed for each brightness command value. The illuminance of the light source for each of these output current command values declines uniformly at the same ratio with the lapse of time, as described before.

Accordingly, each illuminance at the time when each output current command value matched with each brightness command value is outputted is calculated from the prescribed illuminance value prescribed for each brightness command value and from the aforementioned ratio. Then, the relationship between each brightness command value and each output current command value in the conversion table is calibrated on the basis of the relationship between each output current command value matched with each brightness command value and each of the calculated illuminances, such that each illuminance at the time when each output current command value matched with each brightness command value is outputted is set to each prescribed illuminance value prescribed for each brightness command value.

According to the invention described above, since specific output current command values are outputted only once at the time of calibration of the conversion table, it is sufficient if the time-consuming measurement of illuminance is performed only once at this juncture, so that the calibration can be conducted in a short time. In addition, the calibration of the illuminating device is an important setting affecting the measurement accuracy and therefore should be performed by a serviceman. In the present invention, however, the calibration time of the illuminating device by the service man can be shortened substantially, so that the calibration cost incurred by the user can be reduced correspondingly.

The calibrating unit may calibrate each output current command value in the conversion table. According to the present invention, each output current command value is calibrated on the basis of the relationship between each output current command value matched with each brightness command value and each illuminance calculated by the ratio calculating unit, such that each illuminance at the time when each output current command value matched with each brightness command value is outputted is set to each prescribed illuminance value prescribed for each brightness command value. According to the present invention, since calibrated values of the respective output current command values can be calculated by the same identical method, calculation concerning the calibration can be simplified.

The calibrating unit may calibrate each brightness command value in the conversion table. According to the present invention, each brightness command value is calibrated to a brightness command value which gives a prescribed illuminance value equivalent to each illuminance calculated for each output current command value matched with each brightness command value. Since the relationship between the brightness command value and the prescribed illuminance value can, in many cases, be expressed by a predetermined mathematical formula, a brightness command value which gives a prescribed illuminance value equivalent to each of the calculated illuminances can be determined accurately, so that the conversion table can be calibrated with high accuracy. It should be noted that a brightness command value which gives an illuminance (e.g., 12600) calculated with respect to an output current command value (e.g., 2892) matched with an inputted maximum brightness command value (e.g., 100) becomes, for example, 86, which is lower than the inputted maximum brightness command value (e.g., 100). Accordingly, in this method, it is possible to calibrate only up to a low predetermined brightness command value (e.g., 86) with respect to the inputted maximum brightness command value (e.g., 100). Accordingly, in a region from a brightness command value (e.g., 87) greater than the predetermined low brightness command value (e.g., 86) to the inputted maximum brightness command value (e.g., 100), each output current command value matched with each brightness command value is calibrated in the method described in the preceding paragraph, i.e., such that the illuminance at the time when the output current command value is outputted is set to a prescribed illuminance value prescribed for each brightness command value.

According to another aspect of the invention, there is provided a method of calibrating an illuminating device including: a storage unit configured to store a conversion table in which an output current command value is matched with each brightness command value which is an inputted command value of illuminance; a light source; and a control unit configured to read from the conversion table an output current command value corresponding to the inputted brightness command value, and configured to output the output current command value to the light source, including: reading from the conversion table an output current command value corresponding to a specific brightness command value and outputting the output current command value to the light source; measuring the illuminance of illuminating light emitted from the light source, when the output current command value is outputted to the light source; calculating a ratio between the illuminance and a prescribed illuminance value prescribed for the specific brightness command value; calculating each illuminance when each output current command value matched with each brightness command value is outputted, from each prescribed illuminance value prescribed for each of the brightness command values and from the calculated ratio; and calibrating the relationship between each brightness command value and each output current command value in the conversion table on the basis of the relationship between each output current command value matched with each brightness command value and each of the calculated illuminances, such that each illuminance at the time when each output current command value matched with each brightness command value is outputted is set to each prescribed illuminance value prescribed for each of the brightness command values.

In this aspect of the invention as well, in the same way as described above, it is sufficient to conduct the time-consuming illuminance measurement only once at the time of calibrating the conversion table, the calibration of the illuminating device can be shortened, and the calibration time of the illuminating device by the service man can be shortened substantially. Therefore, the calibration cost incurred by the user can be reduced correspondingly.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 2 is a diagram illustrating a part of a conversion table stored in a storage unit;

FIG. 3 is a diagram illustrating prescribed values of illuminance with respect to brightness command values;

FIG. 4 is a diagram illustrating the relationship between the conversion table calibrated at the time of shipment of the illuminating device and the prescribed illuminance values;

FIG. 6 is a diagram illustrating the illuminance which is measured in a calibration-use output step;

FIG. 7 is a diagram illustrating the illuminance with respect to each output current command value calculated from a calculated ratio;

FIG. 8 is a diagram illustrating the relationship between the calibrated conversion table and prescribed illuminance values; and FIG. 9 is a diagram illustrating the relationship between the conversion table calibrated by another method and prescribed illuminance values.

DETAILED DESCRIPTION OF THE INVENTION

Figure 1:
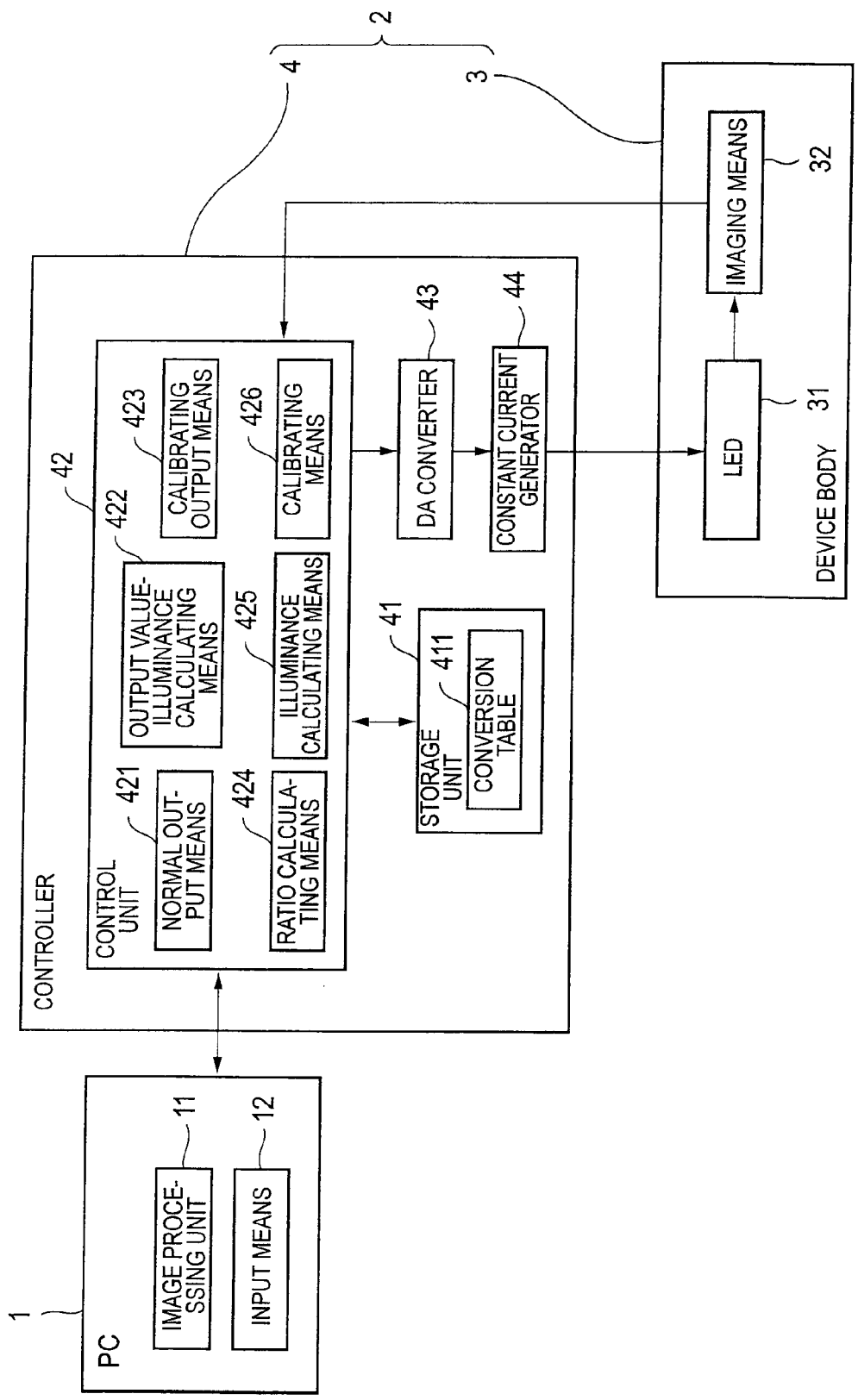
FIG. 1 is a block diagram illustrating the configuration of an image processing apparatus in accordance with an embodiment of the invention.

Hereafter, a description will be given of an embodiment of the invention with reference to the accompanying drawings. FIG. 1 is a block diagram illustrating the configuration of an image processing apparatus in accordance with this embodiment. The image processing apparatus is comprised of a personal computer (PC) 1 and an illuminating device 2. The PC 1 has an image processing unit 11 and an input unit 12. The image processing unit 11 performs such as the edge detection of a workpiece on the basis of a picked-up image of the workpiece imaged by the illuminating device 2 and calculates the profile of the workpiece. The input unit 12 is configured by manually operable buttons or the like, and inputs to the illuminating device 2 a brightness command value, i.e., a command value with respect to the illuminance of the illuminating light to be applied to the workpiece by the illuminating device 2, within a range of 0 to 100%.

The illuminating device 2 has a device body 3 and a controller 4. The device body 3 has an LED 31, i.e., a light source, and an imaging unit 32. The LED 31 is used as a light source of an epi-illumination system for applying illuminating light to the workpiece from immediately above the workpiece, for example. In addition, the LED 31 is disposed circumferentially above the periphery of the workpiece as a light source of a ring illuminating device, and applies illuminating light to the workpiece from above its periphery obliquely at a predetermined angle. In addition, the LED 31 is used as a light source of a transmitting illumination system which irradiates the work from the reverse side of a stage where the workpiece is mounted. The imaging unit 32 is constituted by a CCD (charge-coupled device), and receives the illuminating light emitted from the LED 31 and reflected by the workpiece or the illuminating light emitted from the LED 31 and transmitted through the workpiece so as to image the workpiece.

The controller 4 outputs an output current command value on the basis of a brightness command value which is inputted from the PC 1, and thereby controls the illuminance of the LED 31. It should be noted that in the case where the LED 31 is subjected to PWM (pulse width modulation) control, the output current command value unit a duty ratio. The controller 4 has a storage unit 41, a control unit 42, a DA converter (digital-to-analog converter) 43, and a constant current generator 44.

FIG. 2 is a diagram illustrating a part of a conversion table 411 stored in the storage unit 41. The storage unit 41 is constituted by an EEPROM (electrically erasable and programmable read only memory) or the like, and stores therein the conversion table in which output current command values are respectively matched with brightness command values.

FIG. 3 is a diagram illustrating prescribed values of illuminance with respect to brightness command values. FIG. 4 is a diagram illustrating the relationship between the conversion table 411 calibrated at the time of shipment of the illuminating device 2 and the prescribed illuminance values. The conversion table 411 is calibrated on the basis of the prescribed illuminance values at the time of shipment of the illuminating device 2. The prescribed illuminance values are illuminance values prescribed for brightness command values, as shown in FIG. 3, and can be accurately calculated from a predetermined approximate expression in which the brightness command value is set as a variable. As shown in FIG. 4, the output current command values corresponding to the respective brightness command values in the conversion table 411 are calibrated at the time of shipment of the illuminating device 2 such that the illuminance is set to a prescribed illuminance value prescribed for each brightness command value.

Returning to FIG. 1, the control unit 42 is a microcontroller and has a normal output unit 421, an output value-illuminance calculating unit 422, a calibrating output unit 423, a ratio calculating unit 424, an illuminance calculating unit 425, and a calibrating unit 426. Of these, a description will be given later of the respective unit 423 to 426. The output value-illuminance calculating unit 422 calculates the illuminance of the illuminating light from an output value of the imaging unit 32 which receives the illuminating light emitted from the LED 31. An illuminance measuring unit for measuring the illuminance of the illuminating light emitted from the LED 31 is constituted by the output value-illuminance calculating unit 422 and the imaging unit 32.

The normal output unit 421 reads from the conversion table 411 the output current command value corresponding to the brightness command value inputted from the PC 1, and outputs it to the DA converter 43. The DA converter 43 converts the inputted output current command value from a digital format into an analog format. The constant current generator 44 outputs to the LED 31 a current corresponding to the output current command value of the analog format inputted thereto. Through the above-described configuration, in the state immediately after shipment when the illuminance of the LED 31 has not declined, the illuminating device 2 is able to obtain an illuminance prescribed for the brightness command value, with respect to the inputted brightness command value.

Figure 5:
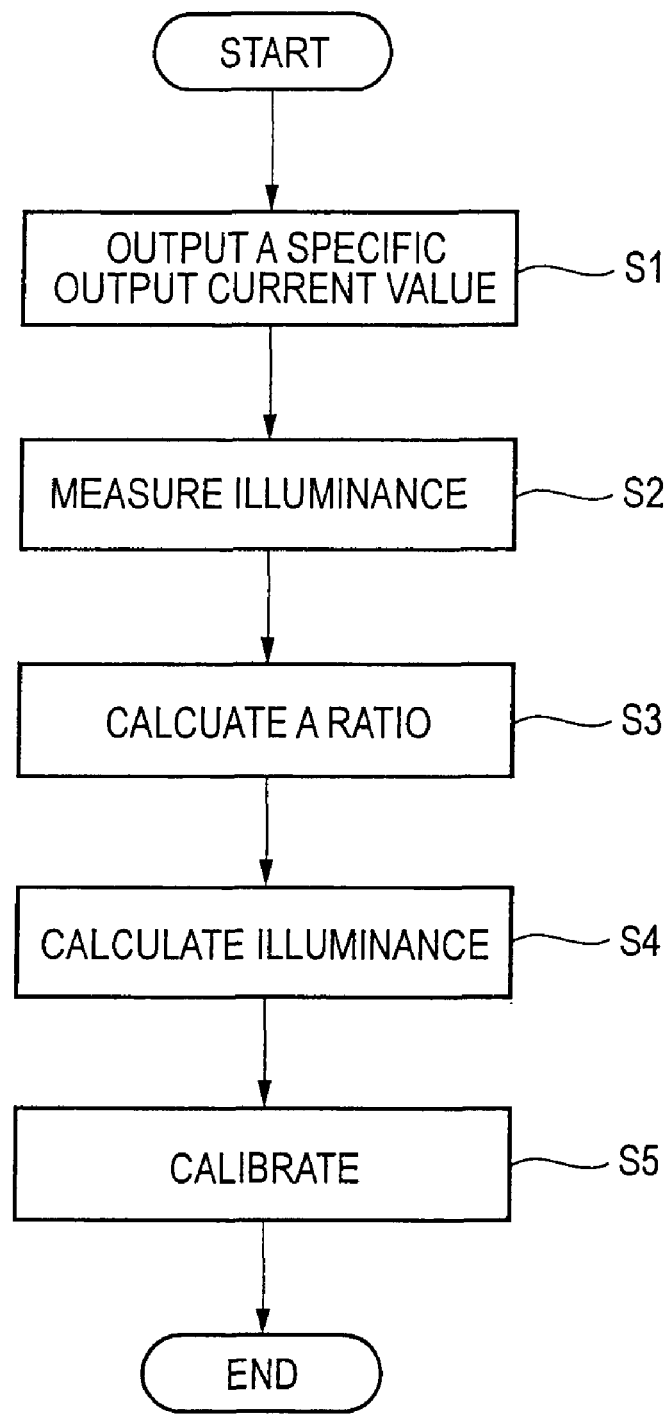
FIG. 5 is a flowchart illustrating a method of calibrating the illuminating device.

Hereafter, with reference to the flowchart shown in FIG. 5, a description will be given of the method of calibrating the conversion table 411 by the illuminating device 2, in conjunction with the functions of the respective unit 423 to 426. When the controller 4 is operated by an operator, the calibrating output unit 423 reads from the conversion table 411 an output current command value corresponding to a specific brightness command value, and outputs that output current command value (calibration-use output step S1). In this embodiment, the calibrating output unit 423 outputs an output current command value 2892 corresponding to a brightness command value 100.

FIG. 6 is a diagram illustrating the illuminance which is measured by the aforementioned step S1. When the LED 31 lights up on the basis of the output current command value 2892 through step S1, illuminating light emitted from the LED 31 is received by the imaging unit 32, and the illuminance of the illuminating light is calculated as, for instance, 12600 by the output value-illuminance calculating unit 422 (calibration-use illuminance measurement step S2).

After step S2, the ratio calculating unit 424 calculates a prescribed illuminance value 18000 (FIG. 4) prescribed for the aforementioned specific brightness command value 100, and calculates a ratio between that prescribed illuminance value 18000 and the illuminance 12600 measured in step S2, i.e., a rate of decline in the illuminance of the LED 31 (ratio calculation step S3). In this embodiment, the ratio, i.e., illuminance measured in step S2/prescribed illuminance value, is calculated as 0.7.

FIG. 7 is a diagram illustrating the illuminance with respect to each output current command value calculated from the aforementioned ratio. Here, causes of the decline in the illuminance of the LED 31 due to the lapse of time lie in the change in properties of a sealing material and a fluorescent material and in the deterioration of a bonding material. However, the present applicant took note of the fact that the largest cause lies in the deterioration of the sealing material due to the lapse of time and a decline in its transmittance. Since the cause of the decline in the illuminance of the LED 31 lies in the decline in the transmittance of the sealing material, when any of the output current command values is outputted, the illuminance should decline uniformly at the rate of decline (0.7) of illuminance when the aforementioned specific output current command value 2892 is outputted. Accordingly, after step S3, the illuminance calculating unit 425 calculates each illuminance at the time when each output current command value matched with each brightness command value is outputted, from each prescribed illuminance value prescribed for each brightness command value, on the basis of the ratio calculated in step S3, as shown in the hatched portion in FIG. 7 (illuminance calculation step S4).

FIG. 8 is a diagram illustrating the relationship between the calibrated conversion table 411 and prescribed illuminance values. After step S4, the calibrating unit 426 calibrates the relationship between each brightness command value and each output current command value in the aforementioned conversion table on the basis of the relationship between each output current command value matched with each brightness command value and each illuminance calculated in the aforementioned step S4, such that each illuminance at the time when each output current command value matched with each brightness command value is outputted is set to each prescribed illuminance value prescribed for each brightness command value (calibration step S5).

Specifically, the calibrating unit 426 calibrates each output current command value (e.g., 2892 (FIG. 7)) matched with each brightness command value (e.g., 100) in the conversion table 411 to each output current command value (e.g., 4445) at which the illuminance at the time when the output current command value is outputted is set to the prescribed illuminance value (e.g., 18000) prescribed for each brightness command value (e.g., 100), on the basis of the relationship between each output current command value (e.g., 2892) matched with each brightness command value (e.g., 100) and each illuminance (e.g., 12600) calculated in the aforementioned step S4.

FIG. 9 is a diagram illustrating the relationship between the conversion table 411 calibrated by another calibration method and prescribed illuminance values. It should be noted that the calibrating unit 426 may calibrate each brightness command value (e.g., 100 (FIG. 7)) to a brightness command value (e.g., 86) which gives a prescribed illuminance value equivalent to each illuminance (e.g., 12600 (FIG. 7)) calculated for each output current command value (e.g., 2892 (FIG. 7)) matched with each brightness command value. In this case, it is possible to calibrate only up to a low predetermined brightness command value (e.g., 86) with respect to the inputted maximum brightness command value (e.g., 100). Accordingly, in a region from a brightness command value (e.g., 87) greater than the predetermined brightness command value (e.g., 86) to the inputted maximum brightness command value (e.g., 100), each output current command value matched with each brightness command value is calibrated in the method of the preceding paragraph, i.e., such that the illuminance at the time when the output current command value is outputted is set to a prescribed illuminance value prescribed for each brightness command value.

As such, with the illuminating device 2 after calibration, when an appropriate brightness command value is inputted, an output current command value corresponding to that brightness command value is read from the conversion table 411 by the control unit 42, and that output current command value is outputted to the LED 31 via the DA converter 43 and the constant current generator 44. Since the output current command value has been calibrated in correspondence with the decline in the illuminance of the LED 31 due to the lapse of time, an illuminance (prescribed illuminance value) prescribed for the inputted brightness command value can be obtained by that output current command value. In consequence, it is possible to accurately measure the profile o the workpiece by the image processing unit 11.

In addition, in this embodiment, since predetermined output current command values are outputted only once at the time of calibration of the illuminating device 2, it is sufficient if the time-consuming measurement of illuminance is performed only once at this juncture, so that the calibration of the illuminating device 2 can be conducted in a short time. Further, the calibration of the illuminating device 2 is an important setting affecting the measurement accuracy and therefore should be performed by a service man. In this embodiment, however, the calibration time of the illuminating device 2 by the service man can be shortened substantially, so that the calibration cost incurred by the user can be reduced correspondingly.

In addition, in this embodiment, each output current command value is calibrated on the basis of the relationship between each output current command value matched with each brightness command value and each illuminance calculated by the ratio calculating unit 424, such that each illuminance at the time when each output current command value matched with each brightness command value is outputted is set to each prescribed illuminance value prescribed for each brightness command value. For this reason, since calibrated values of the respective output current command values can be calculated by the same identical method, calculation concerning the calibration can be simplified.

In addition, in this embodiment, each brightness command value is calibrated to, for instance, a brightness command value which gives a prescribed illuminance value equivalent to each illuminance calculated for each output current command value matched with each brightness command value. Since the relationship between the brightness command value and the prescribed illuminance value can be expressed by a predetermined mathematical formula, a brightness command value which gives a prescribed illuminance value equivalent to each illuminance can be determined accurately, so that the conversion table 411 can be calibrated with high accuracy.

It should be noted that the present invention is not limited to the above-described embodiment, and modifications, improvements, and the like within the scope in which the object of the present invention can be attained are included in the present invention. Although in the above-described embodiment the output value-illuminance calculating unit 422 and the imaging unit 32 are used as the illuminance measuring unit for measuring the illuminance of the illuminating light emitted from the LED 31, an illuminance meter used in the calibration of the illuminating device 2 at the time of its shipment may be used as the illuminance measuring unit. Although in the above-described embodiment the LED 31 is used as the light source, organic EL (electro-luminescence) or the like may be used as the light source.

What is claimed is:

1. An illuminating device comprising:
    a storage unit configured to store a conversion table in which an output current command value is matched with each brightness command value which is an inputted command value of illuminance;
    a light source; and
    a control unit including:
        a calibrating output unit configured to read from the conversion table an output current command value corresponding to a specific brightness command value, and configured to output the output current command value to the light source;
        a ratio calculating unit configured to calculate a ratio between the illuminance of illuminating light emitted from the light source and a prescribed illuminance value prescribed for the specific brightness command value, when the output current command value read by the calibrating output unit is outputted to the light source;
        an illuminance calculating unit configured to calculate each illuminance when each output current command value matched with each brightness command value is outputted, from each prescribed illuminance value prescribed for each of the brightness command values and from the calculated ratio; and
        a calibrating unit configured to calibrate a relationship between each brightness command value and each output current command value in the conversion table on the basis of the relationship between each output current command value matched with each brightness command value and each of the calculated illuminances, such that each illuminance at the time when each output current command value matched with each brightness command value is outputted is set to each prescribed illuminance value prescribed for each of the brightness command values.

2. The illuminating device according to claim 1, wherein the calibrating unit calibrates each output current command value in the conversion table.

3. The illuminating device according to claim 1, wherein the calibrating unit calibrates each brightness command value in the conversion table.

4. A method of calibrating an illuminating device including: a storage unit configured to store a conversion table in which an output current command value is matched with each brightness command value which is an inputted command value of illuminance; a light source; and a control unit configured to read from the conversion table an output current command value corresponding to the inputted brightness command value, and configured to output the output current command value to the light source, comprising:
    reading from the conversion table an output current command value corresponding to a specific brightness command value and outputting the output current command value to the light source;
    measuring the illuminance of illuminating light emitted from the light source, when the output current command value is outputted to the light source;
    calculating a ratio between the illuminance and a prescribed illuminance value prescribed for the specific brightness command value;
    calculating each illuminance when each output current command value matched with each brightness command value is outputted, from each prescribed illuminance value prescribed for each of the brightness command values and from the calculated ratio; and
    calibrating the relationship between each brightness command value and each output current command value in the conversion table on the basis of the relationship between each output current command value matched with each brightness command value and each of the calculated illuminances, such that each illuminance at the time when each output current command value matched with each brightness command value is outputted is set to each prescribed illuminance value prescribed for each of the brightness command values.

* * * * *